United States Patent [19]
Treuil et al.

[11] Patent Number: 6,071,647
[45] Date of Patent: Jun. 6, 2000

[54] LITHIUM AND MANGANESE DOUBLE OXIDES FOR THE POSITIVE ELECTRODES OF ELECTROCHEMICAL DEVICES, PREPARATION THEREOF, AND ELECTRODES INCLUDING SUCH OXIDES

[75] Inventors: Nadine Treuil, Bordeaux; Josik Portier, Dradignan; Guy Campet, Canejan; Josette Ledran, Longjumeau; Jean-Claude Frison, Lannion, all of France

[73] Assignee: France Telecom, Paris, France

[21] Appl. No.: 08/953,051

[22] Filed: Oct. 17, 1997

[30] Foreign Application Priority Data

Oct. 18, 1996 [FR] France .................................. 96 12690

[51] Int. Cl.[7] .............................. H01M 4/50; C01G 45/12
[52] U.S. Cl. ................... 429/224; 429/224; 429/231.95; 423/599; 423/593
[58] Field of Search .............................. 429/224, 231.95; 423/599, 593, 605, 641

[56] References Cited

FOREIGN PATENT DOCUMENTS

| 2 628 664 | 3/1988 | France ............................... B22F 9/30 |
| WO-96 22943 | 8/1996 | WIPO ............................ C01G 45/00 |

OTHER PUBLICATIONS

Journal of the Electrochemical Society, vol. 143, No. 3, Mar. 1996, pp. 879–884.
Patent Abstracts of Japan, vol. 095, No. 009, Oct. 31, 1995, 1 page.

Primary Examiner—Maria Nuzzolillo
Assistant Examiner—J. O'Malley
Attorney, Agent, or Firm—Blakely Sokoloff Taylor & Zafman

[57] ABSTRACT

The invention relates to a method of preparing an oxide of formula $Li_xMn_yO_z$, in which x lies in the range 0 to 2, y lies in the range 1 to 3, and z lies in the range 3 to 4.5, x, y, and z being such that the oxide has a composition close to $LiMn_2O_4$. According to the invention, the method comprises the following steps:

a) a polymer complex of lithium and of manganese is prepared in the form of a gel or of a xerogel by causing a reducing polymer, copolymer or polymer mixture possessing complexing functions for lithium and manganese to react in a common solvent with an oxidizing lithium salt and with an oxidizing manganese salt, and by evaporating off the solvent, partially or in full; and b) the resulting lithium and manganese polymer complex is mineralized by the explosive oxidation-reduction technique to recover fine amorphous particles of the oxide of formula $Li_xMn_yO_z$.

6 Claims, 2 Drawing Sheets

Figure 1 — Charge/discharge rate $\simeq$ C/2
Specific capacity $\simeq$ 100 mAhg$^{-1}$

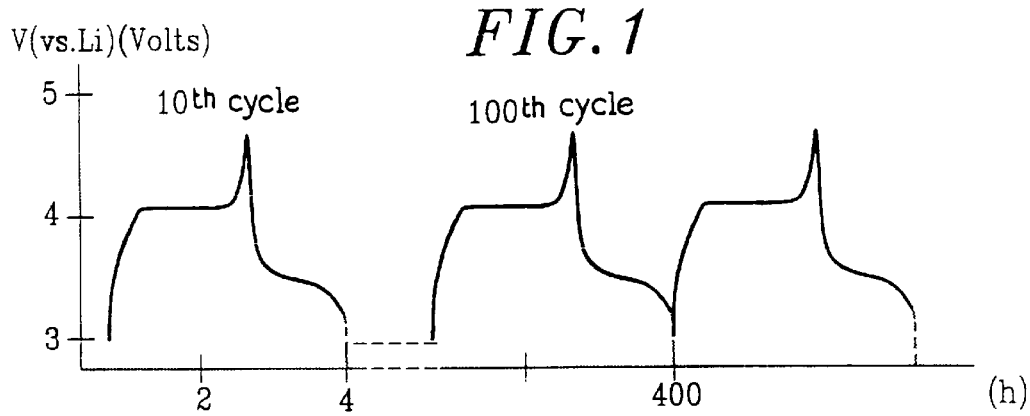
Figure 1 – Charge/discharge rate $\simeq$ C/2
Specific capacity $\simeq$ 100 mAhg$^{-1}$
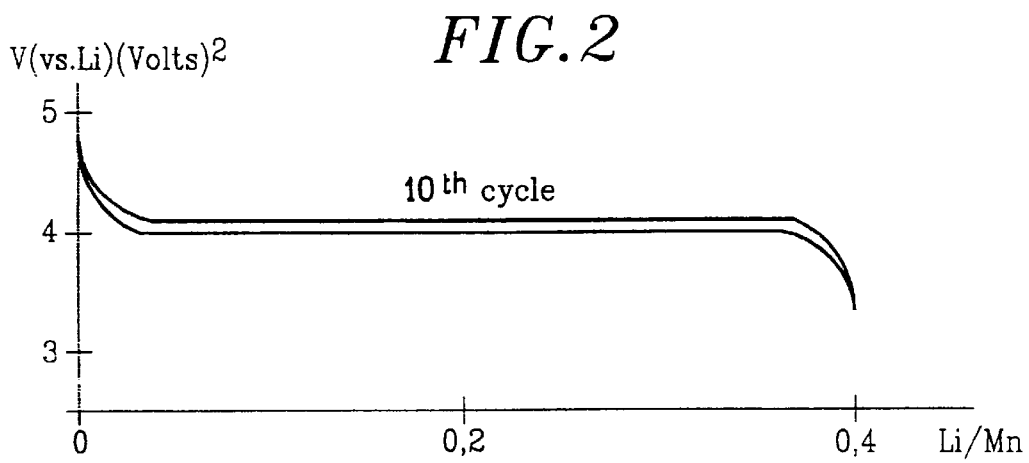
Figure 2 – Charge/discharge rate $\simeq$ C/10
Specific capacity $\simeq$ 130 mAhg$^{-1}$
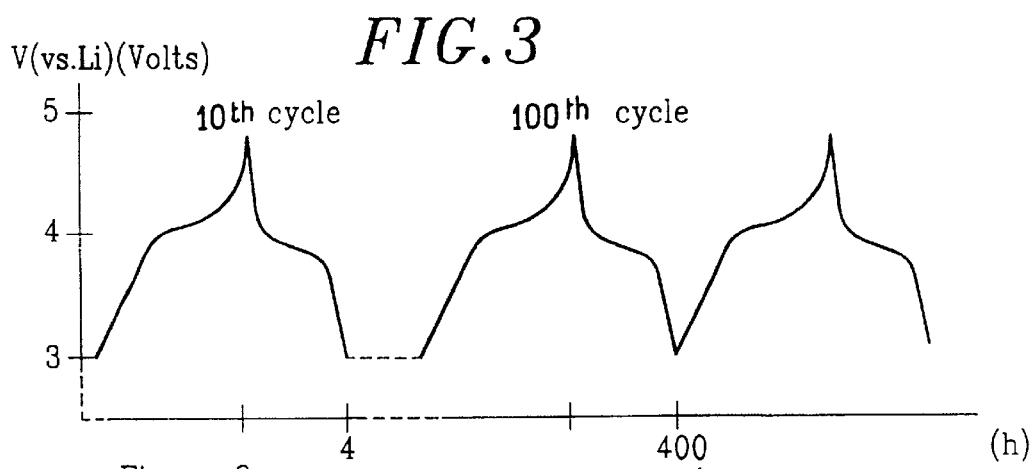
Figure 3 – Charge/discharge rate $\simeq$ C/2
Specific capacity $\simeq$ 150 mAhg$^{-1}$
(The carbon cloth contributes $\simeq$ 50 mAh to the above 150mAh)

Figure 4:
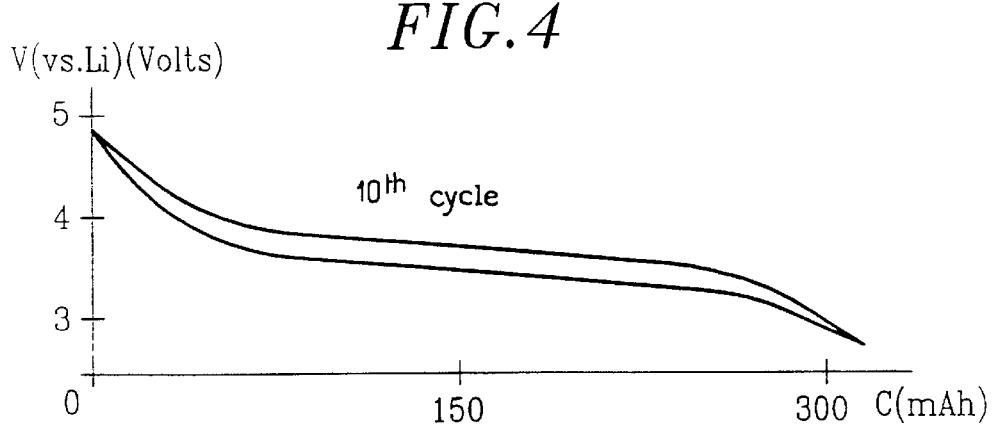

Figure 4 – Charge/discharge rate ≃ C/10
Specific capacity ≃ 300 mAhg$^{-1}$
(The carbon cloth contributes 150 mAh of the above 300 mAh)

LITHIUM AND MANGANESE DOUBLE OXIDES FOR THE POSITIVE ELECTRODES OF ELECTROCHEMICAL DEVICES, PREPARATION THEREOF, AND ELECTRODES INCLUDING SUCH OXIDES

FIELD OF THE INVENTION

The present invention relates in general to positive electrode materials for electrochemical devices, and in particular for lithium ion secondary cells, and to the preparation thereof.

More particularly, the invention relates to a method of preparing an oxide of formula $Li_xMn_yO_z$ in which x lies in the range 0 to 2, y lies in the range 1 to 3, and z lies in the range 3 to 4.5, x, y, and z being such that the composition of the oxide is close to $LiMn_2O_4$.

The invention also relates to the oxide of formula $Li_xMn_yO_z$ obtained by such a method, to a positive electrode for a lithium ion secondary cell including such an oxide, and to a method of preparing such an electrode.

BACKGROUND OF THE INVENTION

The energy capacity of lithium ion secondary cells is much greater than that of lead, nickel-cadmium, or nickel-metalhydride cells.

As a result, a particularly advantageous application thereof lies in making batteries for mobile telephones.

Such lithium ion secondary cells comprise an electrolyte that conducts lithium ions sandwiched between a positive electrode and a negative electrode.

By way of example, the negative electrode material may be lithium itself, an insertion compound of lithium in carbon, or an oxide suitable for inserting lithium. In the latter two cases, such cells are said to be "rocking-chair" cells.

The electrolyte that conducts lithium ions may either be a liquid or a solid, in general of the polymer type, in which there is dissolved a lithium salt that is capable of ionizing to produce lithium ions.

The positive electrode is constituted by an oxide capable of inserting lithium reversibly.

By way of example, mention may be made of oxides having the following formulae $LiNiO_2$ and $LiCoO_2$, and derivatives thereof, which are presently in use in commercially-available batteries; for example, mention may be made of the "lithium-ion" battery which makes use of the $LiCoO_2$ oxide coupled with the compound $Li_xC$.

Also, proposals have already been made to use lithium and manganese double oxides having the general formula $Li_xMn_yO_z$ in which the values of x, y, and z are such that the composition of the oxide is close to $LiMn_2O_4$, for use as a positive electrode material.

Industrially, the advantage of this oxide is that it contains manganese which is considerably less expensive than nickel or cobalt, thereby giving rise to higher performance batteries at lower cost.

Various methods are already known for preparing the lithium and manganese double oxide of formula $Li_xMn_yO_z$.

For example, mention can be made of a solid state method of synthesizing lithium and manganese double oxide from $MnO_2$ or $Mn_3O_4$ and various lithium salts such as the carbonate, the nitrate, and the hydroxide.

Another known method of synthesizing lithium and manganese double oxide is based on pyrolyzing precipitates obtained from manganese acetate and lithium acetate or carbonate.

In addition, a method is known in which lithium and manganese double oxide is synthesized in the form of a film from targets of $LiMn_2O_4$.

Finally, a method of synthesis is known in which a lithium and manganese polymer complex is formed, and the $LiMn_2O_4$ oxide is obtained by pyrolyzing the complex. In that method, the polymer acts only as a supporting matrix to avoid particles agglomerating, and not at all as a catalyst for the explosive formation of a lithium and manganese double oxide is formed by an explosive reaction.

The above-mentioned methods are explained more particularly in the following publications:

J. M. Tarascon and D. Guyomard, "Li metal-Free rechargeable batteries based on $Li_{1+x}Mn_2O_4$ cathode ($0 \leq x \leq 1$) and carbon anodes", J. Electrochem. Soc., Vol. 138, No. 10, October 1991, pp. 2864–2868;

A. Momchilov et al., "Rechargeable lithium battery with spinel-related $MnO_2$. II. Optimization of the $LiMn_2O_4$ synthesis conditions", J. of Power Sources, 41 (1993), pp. 305–314;

Quingzhong Xu and Guoxiang Wan, "Rechargeable $Li/LiMn_2O_4$ batteries with a polymeric solid electrolyte", Journal of Power Sources, 41 (1993), pp. 315–320;

Yvan Gao and J. R. Dahn, "Thermogravimetric analysis to determine the lithium to manganese atomic ratio in $Li_{1+x}Mn_{2-x}O_4$", App. Phys. Lett., 66 (19), May 8, 1995, pp. 2487–2489;

S. R. Sahaya Prabaharan et al., "Bulk synthesis of submicrometer powders of $LiMn_2O_4$ for secondary lithium batteries", J. Mater. Chem., 1995.5 (7), pp. 1035–1037;

K. H. Hwang et al., "Fabrication and characterization of an Li—Mn—O thin film cathode for rechargeable lithium microbatteries", J. of Power Sources, 54 (1995), pp. 224–227;

K. Kanamura et al., "Structural change of the $LiMn_2O_4$ spinel structure induced by extraction of lithium", J. Mater. Chem., 1996, 6 (1), pp. 33–36;

W. Liu et al., "Synthesis and electrochemical studies of spinel phase $LiMn_2O_4$ cathode materials prepared by the Pechini process", J. Electrochem. Soc., Vol. 143, No. 3, March 1996, pp. 879–884;

JP 07142065, HAYAHI YASUSHI, "Manufacture of active material for lithium secondary battery";

WO 96 22 943; and

FR 2 628 664.

OBJECT AND BRIEF SUMMARY OF THE INVENTION

One of the drawbacks of the above-mentioned methods already known in the state of the art is that they do not enable industrial quantities (i.e. large quantities) of such a lithium and manganese double oxide to be manufactured, since when such methods are implemented on an industrial scale on large quantities of substance, they lead to $Li_xMn_yO_z$ oxides being made which are not uniform and which have crystallites of relatively large sizes including defects. Such materials cannot be used, in particular for making electrodes, since they then have poor electrochemical efficiency.

The present invention provides a novel method of preparing an oxide of formula $Li_xMn_yO_z$, in which x lies in the range 0 to 2, y lies in the range 1 to 3, and z lies in the range 3 to 4.5, x, y, and z being such that the oxide has a composition close to $LiMn_2O_4$, wherein the method comprises the following steps:

a) a polymer complex of lithium and of manganese is prepared in the form of a gel or of a xerogel by causing a reducing polymer, copolymer or polymer mixture possessing complexing functions for lithium and manganese to react in a common solvent with an oxidizing lithium salt and with an oxidizing manganese salt, and by evaporating off the solvent, partially or in full; and b) the resulting lithium and manganese polymer complex is mineralized by the explosive oxidation-reduction technique to recover fine amorphous particles of the oxide of formula $Li_xMn_yO_z$.

The values of x, y, and z in the oxide of formula $Li_xMn_yO_z$ obtained by the method of the invention are such that x, y, and z are related by the relationship:

$$x+wy-2z=0$$

where w is the mean degree of oxidation of the manganese.

Thus, in the method of the invention, it is advantageous to use as precursors of the oxide of formula $Li_xMn_yO_z$ polymer complexes of lithium and of manganese. Such complexes are in the form of a gel or a xerogel.

During the manufacture of such polymer complexes, a gel is obtained if part of the common solvent used is evaporated. If all of the solvent is evaporated, then a xerogel is obtained which may be in the form of a film.

Such gels and xerogels of lithium and manganese polymer complex are referred to as "redox hybrids" since they contain a organic portion that is reducing, i.e. the polymer, copolymer, or polymer mixture; and an inorganic portion that is oxidizing, i.e. the complexed lithium and manganese salts.

The advantage of using these "redox hybrid" precursors in the preparation of the oxide of formula $Li_xMn_yO_z$ lies in the fact that in such precursors the lithium and the manganese are statistically distributed at microscopic scale, in the same way as they will be distributed in the resulting oxide of formula $Li_xMn_yO_z$, the Li/Mn atom ratio being equal to x/y. It will also be very finely divided because of the explosive nature of the oxidation-reduction reaction implemented in the method of the invention.

It is not possible to obtain such a distribution of lithium and of manganese in the oxide of formula $Li_xMn_yO_z$ when it is obtained using a method of the above-mentioned state of the art.

Advantageously, in the method of the invention, in step a), the solvent used is water, the reducing polymer is selected from polyacrylamide and polyacrylic acid, and the lithium and manganese salts are selected from chlorides, nitrates, acetates, and any other oxidizing salt that is soluble in the selected solvent.

In an advantageous implementation of the method of the invention, in step a), salts of lithium and of manganese are used containing oxidizing anions to make a lithium and manganese polymer complex in the form of a xerogel, and in step b) the resulting xerogel is heated to a temperature of about 150° C. such that the oxidizing anions give rise to explosive oxidation of the polymer to obtain amorphous particles of the oxide of formula $Li_xMn_yO_z$.

In the above implementation, it is advantageous to use a polyacrylamide and nitrates of lithium and of manganese. During the explosive oxidation of the polymer, soot of the oxide of formula $Li_xMn_yO_z$ is formed. This implementation of the method of the invention corresponds to hyperquenching, the ultrafast cooling of the particles preventing them from crystallizing. They are therefore in an amorphous state. The amorphous particles of oxide of formula $Li_xMn_yO_z$ obtained in this way have a unit size lying in the range about 1 nanometer (nm) to 10 nm.

In a variant implementation of the method of the invention, in step a), lithium and manganese salts are used that contain oxidizing anions to make a lithium and manganese polymer complex in the form of a xerogel, and in step b), the resulting xerogel is oxidized explosively under an oxygen pressure of about $100 \times 10^5$ Pa, the mineralization reaction being triggered by applying a voltage to a metal resistance element.

The invention also provides the oxide of formula $Li_xMn_yO_z$ capable of being obtained by the above-specified method.

It should be specified that, advantageously, all of the implementations of the method of the present invention make it possible to obtain, at low temperature, specifically on an industrial scale, large quantities of a material constituting a stoichiometric double oxide of lithium and of manganese that is in the form of a very finely divided powder of particularly uniform grain size, with crystallites that are free from defects, thereby leading to high electrochemical efficiency (see the electrochemical curves of FIGS. 1 to 4). Such electro-chemical efficiency guarantees that the $Li_xMn_yO_z$ oxide obtained by the method of the invention is uniform in composition, with such a method making it possible, as mentioned above, to conserve the stoichiometric ratio of Li/Mn at atomic scale by making use of polymer complexes.

On an industrial scale, the polymer complex initially obtained by the method of the invention is particularly suitable for making a continuous film which is caused to travel along a transporter bench through a tunnel oven so as to provide the final powder substance.

Figure 5:
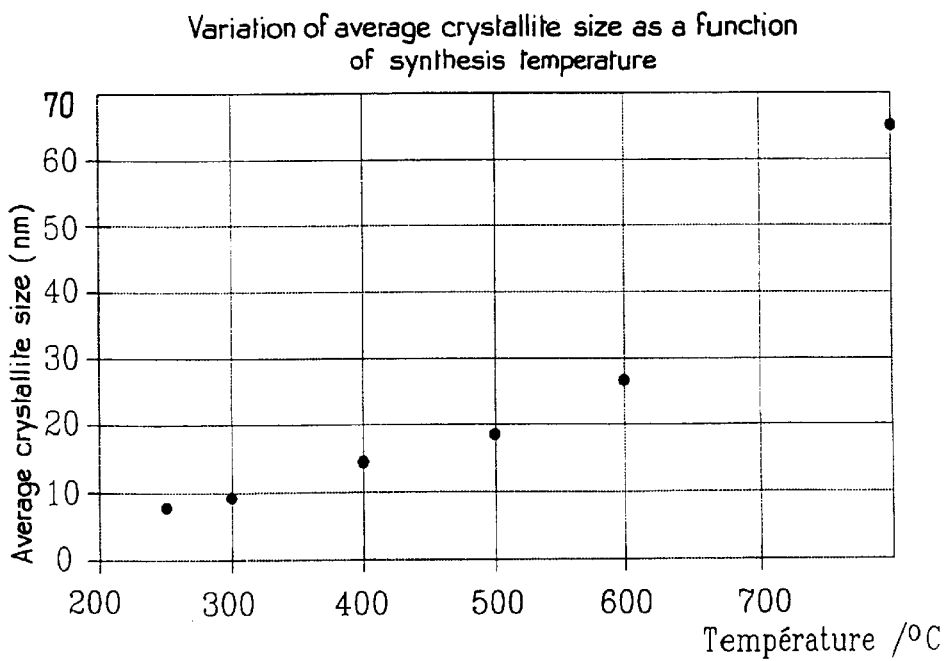

By way of example, FIG. 5 shows how the size of crystallites of the oxide in question varies as a function of the annealing temperature.

As can be seen in FIG. 5, the crystallites of the starting material obtained by the method of the invention have a size of the order of 10 nm .

The invention also provides a positive electrode for a lithium ion secondary cell, wherein the electrode comprises a mixture containing an oxide of formula $Li_xMn_yO_z$ of the invention, carbon that provides electrical conductivity, and a polymer that provides the electrode with suitable mechanical properties, said mixture being placed on a metal support.

For example, it is possible to envisage using Nylon (registered trademark) or polyvinyl-difluoride as the polymer. The metal support may be a grid of stainless steel, or a metal foam, e.g. made of nickel.

In non-conventional manner, the present invention also provides a method of preparing a positive electrode for a lithium ion secondary cell, the method comprising the following steps:

a) a lithium and manganese polymer complex is made in the form of a gel by causing a polymer, a copolymer, or a mixture of polymers possessing complexing functions for lithium and for manganese to react in a common solvent with a lithium salt and with a manganese salt, and by evaporating off part of the solvent;

b) a metal support is impregnated with the resulting lithium and manganese polymer complex gel to which finely divided carbon has been added;

c) said impregnated support is dried; and d) said impregnated support is mineralized under conditions such that the carbon and the metal support are not themselves oxidized.

The metal support may either be a grid or a metal foam.

In a variant of the above method, the following steps are performed:

a) a lithium and manganese polymer complex is made in the form of a gel by causing a polymer, a copolymer, or a mixture of polymers possessing complexing functions for lithium and for manganese to react in a common solvent with a lithium salt and a manganese salt, and by evaporating off part of the solvent;

b) a support such as a carbon felt or cloth of very high specific surface area is impregnated with the resulting lithium and manganese polymer complex gel; and c) the impregnated support is mineralized at a temperature not less than 350° C. under an appropriate atmosphere.

The positive electrode of the invention obtained in this way has very high electrochemical capacity since the lithium ions are fixed both on the double oxide of formula $Li_xMn_yO_z$ and on the carbon support.

Naturally, the present invention is not limited in any way to the implementations described, but covers all variants thereof, in particular variants relating to the preparation of an oxide of formula $Li_xMn_yO_z$ in which an atom is replaced by an equivalent atom. In particular, it is possible to envisage that one or more atoms of manganese could be replaced by one or more atoms of iron.

MORE DETAILED DESCRIPTION

EXAMPLE 1

0.089 grams (g) of lithium carbonate (ALDRICH ref. 20,362-9) and 1.186 g of divalent manganese acetate tetrahydrate (ALDRICH 22,100-7) and 50 cc of distilled water were placed in a beaker with magnetic stirring; nitric acid was added until the ingredients had dissolved completely.

1 g of poly(acrylamide) (ALDRICH 18,127-7) was slowly added to the solution. It was then stirred magnetically for 12 hours at 50° C. The water was then evaporated on a hot plate at 90° C. until a xerogel was obtained. The xerogel was raised to about 150° C.; explosive mineralization took place leading to an oxide soot that was amorphous to X-rays. The soot was pyrolyzed for 12 hours in air at 500° C. The X-ray diffraction spectra included the spectrum of the spinel phase corresponding to the formula $LiMn_2O_4$.

0.020 g of this powder were mixed with 0.002 g of amorphous carbon (ALDRICH 38,946-3). The result was mixed with 0.003 g of poly(tetrafluoroethylene) (ALDRICH 18,247-8). A flexible electrode in the form of a disk having a diameter of 1 cm and a thickness of about 100 $\mu$m was obtained by pressing the above mixture at a pressure of 1000 km/cm². Pressing can optionally be performed on a supporting grid of stainless steel in order to reinforce the mechanical properties thereof.

A secondary cell was made as follows:

The positive electrode was constituted by the above composite, and the negative electrode by a disk of metallic lithium (ALDRICH 26,599-3). The electrolyte comprised one mole of $LiPF_6$ (ALDRICH 20,114-6) per liter dissolved in a solution containing 67% by weight of ethylene carbonate (ALDRICH E2,625-8) and 33% by weight of propylene dimethyl carbonate (ALDRICH D15,292-7). A disk (GLASS MICROFIBRE FILTERS, WHATMAN) was soaked in this solution and constituted the separator. The three disks, i.e. the negative electrode, the separator, and the positive electrode were placed in a Teflon cylinder. Two metal current collectors of stainless steel provided electrical contact with the negative and positive electrodes, respectively.

The electrochemical behavior of the above assembly was studied in galvanostatic mode.

FIG. 1 shows the results obtained for C/2 cycling, corresponding to an applied current of 1 mA. It shows that the electrochemical system is reversible. It corresponds to a capacity of 100 mA.h/g of cathode material continuing to be available after more than 100 cycles; the capacity was greater than 130 mA.h/g for C/10 cycling (FIG. 2).

EXAMPLE 2

0.123 g of lithium acetate dihydrate (ALDRICH ref. 21,319-5) and 1.186 g of divalent manganese acetate tetrahydrate (ALDRICH ref. 22,100-7) and 50 cc of distilled water were placed in a beaker with magnetic stirring.

1 g of poly(acrylic) acid (FLUKA ref. 81140) was added slowly to the solution. The mixture was stirred magnetically for 12 hours at 50° C. Part of the water was evaporated off on a hot plate at 50° C. until a gel was obtained.

A carbon cloth having very high specific area, 2000 m²/g—(KYNOL activated carbon) was soaked in the gel and dried in an oven at 100° C. The assembly was then annealed at 500° C. for 10 hours.

The composite corresponded to an equal mass mixture of the two components. Those proportions make it possible to combine the capacity effects of the carbon cloth with intercalation of the oxide, both components being in direct contact with the electrolyte.

As in Example 1, a battery was made by using a separator and a negative electrode of similar kind.

FIG. 3 shows the results obtained for cycling at C/2 corresponding to an applied current of 1 mA. It likewise shows excellent reversibility of the electro-chemical system. It corresponds to a capacity of 150 mA.h/g for the oxide material. When cycling at C/10, greater capacities are achieved, of 300 mA.h/g (FIG. 4). These high capacities show the advantage of the carbon cloth whose capacity effect is added to the process of insertion in the oxide. In addition, it makes it possible to avoid using a conventional current collector whose mass reduces the overall capacity per unit mass of the battery.

What is claimed is:

1. A method of preparing an oxide of formula LixMnyOz, in which x lies in the range 0 to 2, y lies in the range 1 to 3, and z lies in the range 3 to 4.5, the method comprising the following steps:

a) a polymer complex of lithium and of manganese is prepared in the form of a gel or of a xerogel by causing a reducing polymer, copolymer or polymer mixture including at least one of polyacrylamide and polyacrylic acid possessing complexing functions for lithium and manganese to react in a solvent with an oxidizing lithium salt and with an oxidizing manganese salt, and by evaporating off the solvent, partially or in full; and b) the resulting lithium and manganese polymer complex is mineralized by an explosive oxidation-reduction to recover fine amorphous particles of the oxide of formula $Li_xMn_yO_z$.

2. A method according to claim 1, wherein in step a), the solvent used is water, and the lithium and manganese salts are selected from the group consisting of chlorides, nitrates and acetates.

3. A method according to claim 1, wherein in step a), salts of lithium and of manganese are used containing oxidizing anions to make a lithium and manganese polymer complex in the form of a xerogel, and in that in step b) the resulting xerogel is heated to a temperature of about 150° C. such that the oxidizing anions give rise to explosive oxidation of the polymer to obtain amorphous particles of the oxide of formula $Li_xMn_yO_z$.

4. A method according to claim 1, wherein in step a), lithium and manganese salts are used that contain oxidizing anions to make a lithium and manganese polymer complex in the form of a xerogel, and in that in step b), the resulting xerogel is oxidized explosively under an oxygen pressure of about $100 \times 10^5$ Pa.

5. A method of preparing a positive electrode for a lithium ion secondary cell, the method comprising the following steps:

a) a lithium and manganese polymer complex is made in the form of a gel by causing a polymer, a copolymer, or a mixture of polymers including at least one of polyacrylamide and polyacrylic acid possessing complexing functions for lithium and for manganese to react in a solvent with a lithium salt and with a manganese salt, and by evaporating off part of the solvent;

b) a metal support is impregnated with the resulting lithium and manganese polymer complex gel to which carbon has been added;

c) said impregnated support is dried; and d) said impregnated support is mineralized under conditions such that the carbon and the metal support are not themselves oxidized.

6. A method of preparing a positive electrode for a lithium ion secondary cell, the method comprising the following steps:

a) a lithium and manganese polymer complex is made in the form of a gel by causing a polymer, a copolymer, or a mixture of polymers including at least one of polyacrylamide and polyacrylic acid possessing complexing functions for lithium and for manganese to react in a solvent with a lithium salt and a manganese salt, and by evaporating off part of the solvent;

b) a support including a carbon felt or cloth impregnated with the resulting lithium and manganese polymer complex gel; and c) the impregnated support is mineralized at a temperature not less than 350° C.

* * * * *

UNITED STATES PATENT AND TRADEMARK OFFICE
CERTIFICATE OF CORRECTION

PATENT NO.: 6,071,647
DATED: June 6, 2000
INVENTOR(S): Nadine Treuil et al It is certified that error appears in the above-identified patent and that said Letters Patent is hereby corrected as shown below:

In Claims, at Claim 1, delete "LixMnyOz" and insert -- $Li_xMn_yO_z$ --.

Signed and Sealed this

Twenty-second Day of May, 2001

NICHOLAS P. GODICI

*Attest:*

*Attesting Officer*   *Acting Director of the United States Patent and Trademark Office*